Figure 1:
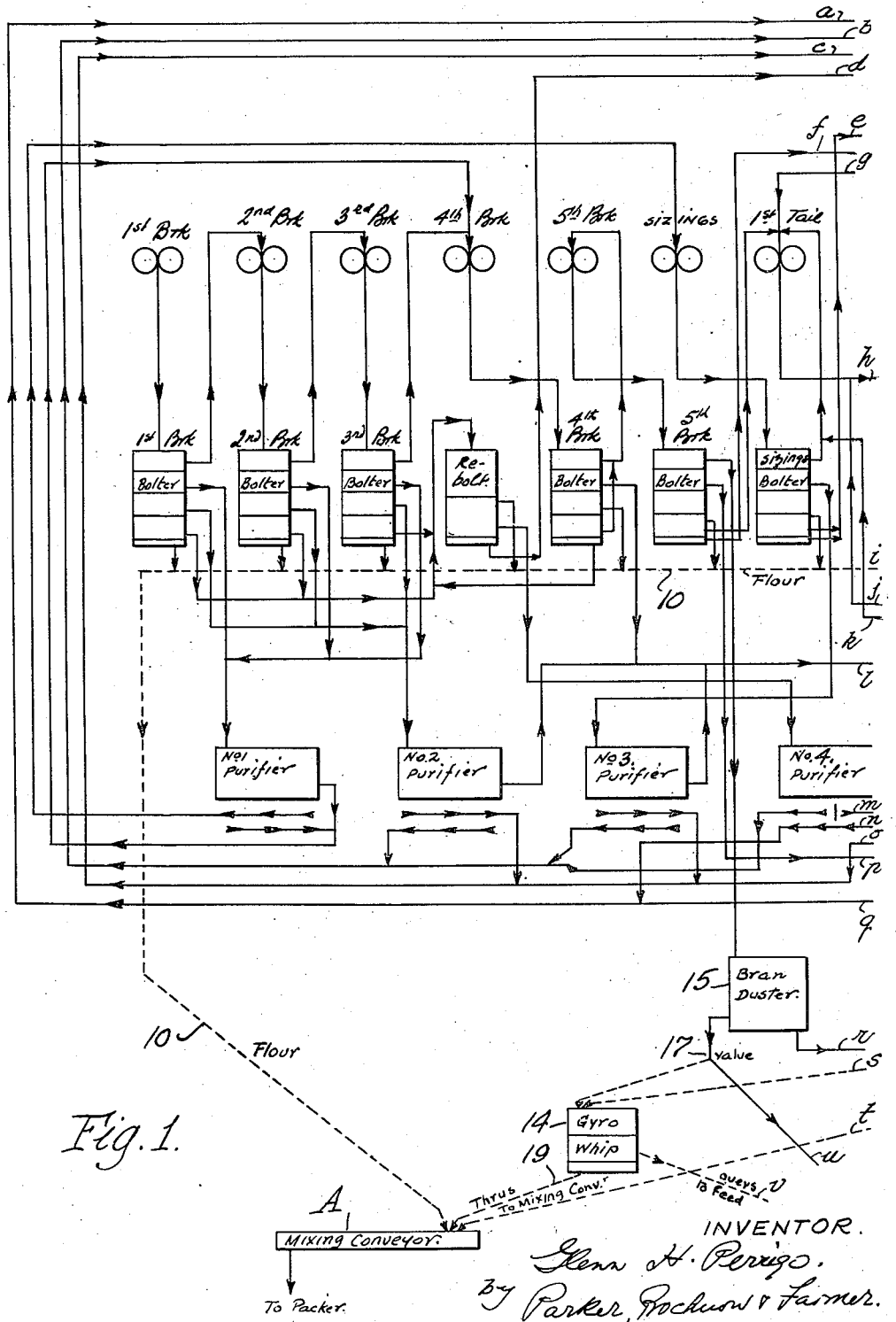

May 19, 1942.  G. H. PERRIGO  2,283,571
METHOD OF MAKING FLOUR
Filed Jan. 28, 1939   2 Sheets-Sheet 2

INVENTOR.
Glenn H. Perrigo
By Parker, Trockum & Farmer.
ATTORNEYS.

Patented May 19, 1942

2,283,571

UNITED STATES PATENT OFFICE 2,283,571

METHOD OF MAKING FLOUR

Glenn H. Perrigo, Pittsford, N. Y., assignor to Victor Flour Mills, Inc., Pittsford, N. Y.

Application January 28, 1939, Serial No. 253,439

11 Claims. (Cl. 83—42)

This invention relates to improved food products and an improved method of making the same, and more particularly to the production of an improved wheat flour and method of milling the same. The wheat grain has approximately six separate coverings or envelopes forming the bran or integument of the grain, practically all of which coverings are usually removed in the mill from the remainder of the wheat grains and discarded in the manufacture of white flour. Most of these coatings or layers forming the bran or integument of the grain are substantially all hard, fibrous or cellulose material, with substantially no mineral matter or other food components therein, so that when not removed, they add nothing of value to the flour except bulk. The innermost layer or coating forming part of the bran contains considerable mineral matter and other element of food value, but instead of being fibrous or largely cellulose, it is relatively brittle and non-fibrous in character.

When wheat grains were treated by prior milling methods in making any kind of flour, the various layers of the bran adhered tenaciously together, and it was impossible in a commercially feasible manner to separate the brittle or non-fibrous portions of the bran from the objectionable, hard, fibrous portions. In the manufacture of white flour, the general custom heretofore has been to first temper the grain by adding moisture thereto, shortly before milling the grains, for the purpose of toughening the bran coatings so that all the bran would adhere together, and to swell the germs of the grains in such a manner as to facilitate their removal from the middlings during the milling process. The germs of the wheat grains are rich in oils, fats, nitrogenous materials and vitamins, and the non-fibrous or relatively brittle portions of the bran coating, which are believed to be largely the aleurone cells or layer of the bran are also rich in mineral matter and food nutriment. Heretofore the germ and the non-fibrous portions of the bran which are relatively rich in food value have been largely discarded from the grains in making white flour, and such discarded portions used as stock feed.

Many people like whole wheat bread, but it does not agree with some of them owing to the fact that the hard, fibrous particles of the bran, which are almost pure cellulose, are unaltered by the digestive processes and, because of their hardness and sharp fibrous nature, are irritating to the intestinal tracts of many people. Whole wheat, entire wheat and graham flours which have contained all of the bran heretofore, have always been difficult to convert into bread or baked goods and obtain an attractive light loaf, because the hard fibrous particles of the bran appear to prevent the particles of the dough from clinging closely together, with the result that some of the carbon dioxide necessary to make a light, porous loaf during the leavening of the dough is able to escape instead of causing porosity of the loaf. For these reasons there has heretofore been only a rather limited demand for the various whole wheat, entire wheat and graham flours. All attempts heretofore to include the wheat germ and any part of the bran in the flour has resulted in a flour which was relatively dark and gray in color, that is, a dirty specky color, and which produced a loaf which was unattractive and unappetizing.

One object of the present invention is to provide an improved germ containing flour from wheat grains which will contain the maximum possible amount of all the parts of the wheat grains which have any value as foods, and which contain substantially all of the minerals and nutriment available in the grains; which will be largely free of the unusable, objectionable and unassimilable components of the wheat grains, such as the hard, fibrous or cellulose layers of the bran; which may be made into various baked goods, including breads, biscuits, cereal foods, cakes and the like in the same manner that ordinary wheat flour is employed by substantially the same recipes.

Another object of the invention is to provide an improved method of milling wheat grains to produce an improved germ containing flour having substantially all of the desirable food value available in the wheat grains, and for eliminating from such flour the undesirable and unassimilable components of the grain, by the use of apparatus commonly employed now in the milling industry and available in most flour mills, and without material alteration of existing flour mill machinery, without material additional expense in the milling process, and without rendering such milling machinery unsuitable for the subsequent milling of white flour.

Another object of the invention is to provide a new and improved germ containing flour from wheat, which when made into baked goods, such as bread, will have the texture, smoothness, lightness and generally pleasing appearance of baked goods made from ordinary white flour, but which will also possess a wheaty, nut-like flavor and a high mineral, fat, nitrogenous and vitamin content; which will have all of the appetite satisfying qualities and food value of whole, graham and entire wheat flour, breads and baked goods; which will be unobjectionable in color; which will closely resemble in texture and appearance the baked goods made from ordinary white flour; and which will be substantially free of the objectionable and undesirable hard, fibrous, irritating and indigestible portions of the bran and grain.

Another object of the invention is to provide an improved method of milling wheat grains to obtain such an improved flour, which will not materially increase the milling cost above that of ordinary white flour, and which will be relatively simple, economically feasible and inexpensive.

A further object of the invention is to provide an improved process of milling wheat grains to produce a flour, with which the relatively brittle food bearing portions of the bran or integument of the grain may be largely separated and segregated from the hard, fibrous and substantially pure cellulose portions of the bran.

Various other objects and advantages will appear from the following description of the improved product and one manner of making the same, and the novel features will be particularly pointed out hereinafter in connection with the appended claims.

Figure 2:
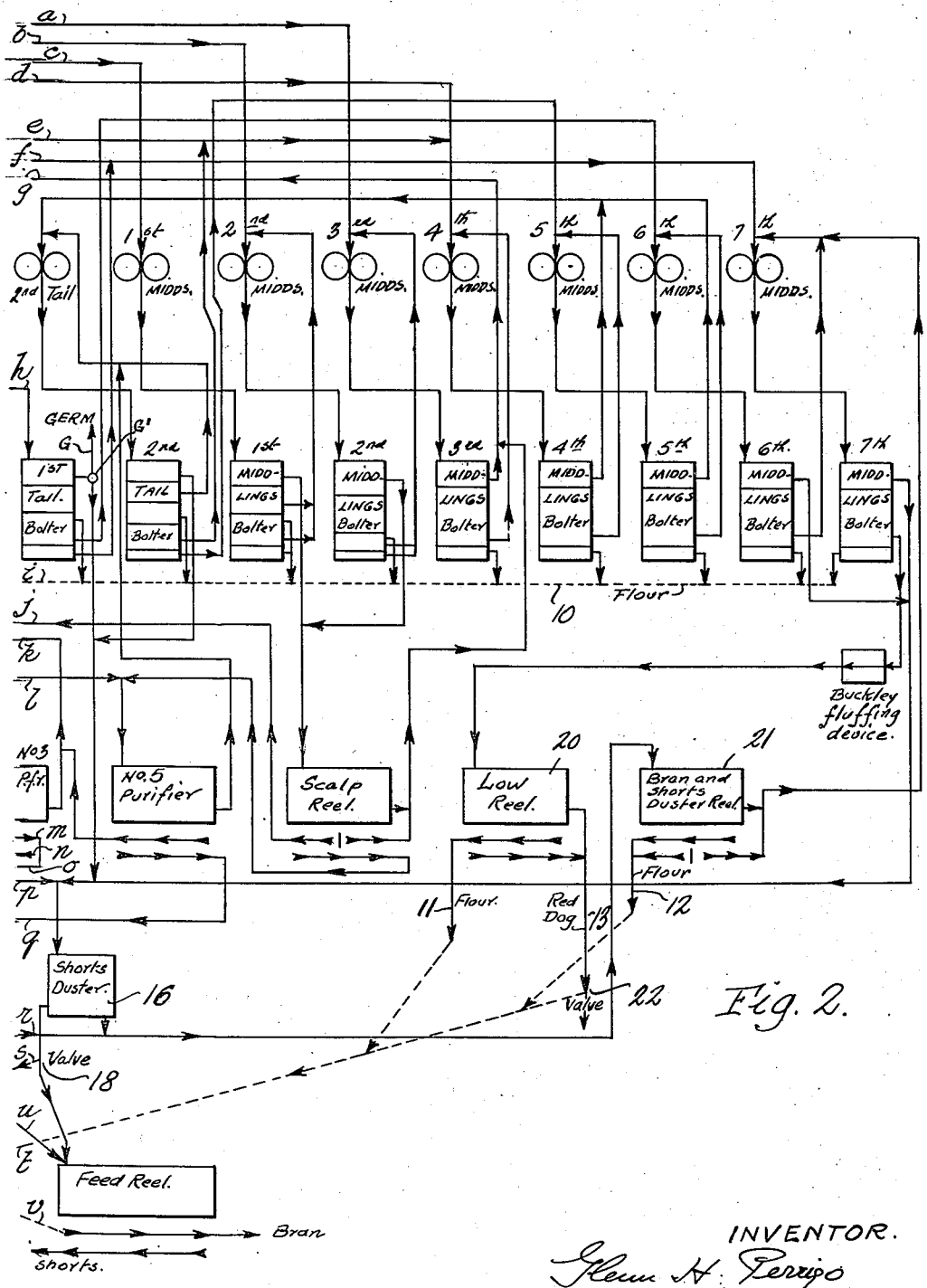

In the drawings, I have illustrated, diagrammatically, a flow sheet illustrating the flow in one embodiment of the invention, and in these drawings Fig. 1 is approximately the left half of the diagram, and Fig. 2 is the remainder of the diagram, the two drawings being disposed side by side to form the complete flow diagram.

In accordance with this invention, the improved flour is made generally by the so-called "long" or "gradual reduction" process of milling which is now extensively and almost universally employed in this country in the manufacture of white flour from wheat. It is unnecessary in milling this improved flour in accordance with this invention to purchase any additional milling equipment not useful and utilizable in connection with the milling of ordinary white flour by this process.

It has long been recognized that fruits and grains carry most of the valuable mineral matter and other valuable food materials in the portions immediately under the skin or integument of the fruit or grain, and in various processing operations heretofore employed in converting such fruit and grain products into desired, edible condition, the removal of such integuments and skins has been accompanied with such a substantial adherent portion of the body of the fruits or grains immediately underneath the skin or envelope thereof, that a very substantial amount of the mineral and most valuable food parts of the fruits and grains has been lost. In accordance with this invention, the milling is so carried out as to utilize and incorporate in the flour all portions of the wheat grains including the germ which contain the mineral matter and any nutriment, and to discard substantially all of the fibrous, non-assimilable portions of the bran or integument of the grain.

In the practice of the long or gradual reduction process of milling white flour, the grain, after being scoured and washed, is tempered by the addition of moisture to the grains in such a manner that the moisture content of the grains is increased. This added moisture content performs two functions, one of which is to toughen the bran coating and cause all portions thereof to adhere firmly together, and the other is to cause the germ of the wheat to swell and thus facilitate its removal from the endosperm of the grain. Heretofore in this long process, various grades of white flour have been produced by a classification of the various portions of the endosperm. The inner portions of the endosperm contain less strong gluten than the outer portions, the strength of the gluten varying somewhat progressively from the inner to the outer portion of the endosperm. Consequently, a so-called "Short Patent" flour has been produced primarily from the inner portions of the endosperm. A standard baker's flour contains more of the outer portion. A strong baker's flour or First Clear is made mostly from the outer portions. The same outside portions of the endosperm containing a substantial number of particles of the bran coating have heretofore been classified as Second Clear flour, Low Grade flour, and Red Dog flour, as little of these portions has been used in the making of white flour because of the specky character and the grayish, brownish tint which the presence of these portions would give to the flour. As a consequence of this method of milling, coupled with the fact that much of the wheaty taste and the strong gluten characteristics of the wheat berry are found in these outer portions of the endosperm, the ordinary white flour has not contained either the strength or the flavor which it would have if such portions of the endosperm were utilized.

In accordance with the present invention, all of the wheat grains, with the exception of the hard, fibrous cellulose layers or portions of the bran, are embodied in a single flour which does not have the objectionable color that would be obtained by the mixing of the discarded Red Dog flour with the other parts of the flour obtained in the normal manner of making white flour, but which does have substantially all of the baking advantages of ordinary white flour.

The so-called "short" process of milling heretofore employed in making whole wheat flour comprises the progressive reduction of the grains by successive breaking and grinding processes as the grains pass in succession through different sets of rollers or breaks, the delivery from each set of rolls being sifted through a reel or suitable sifter, the "throughs" or siftings going directly to the whole wheat flour bin and the residue or "overs" going on to the next rolls of the sequence or succession. By that process all of the bran was retained in the flour, but such flour could not be handled and utilized in the same manner as ordinary white flour in the making of various baked products, for the reasons recited hereinbefore.

The so-called long or gradual reduction process of milling white flour, because of its extensive use in this country, should require no illustration or detailed description. The principle of milling is the same in all installations of milling machinery for practicing this long or gradual reduction process of milling, but some mills have more elaborate and extensive equipment than others. In a small mill the number of classifications and purifications of flour during manufacture is reduced, and some of the steps of reduction in some instances may be eliminated. A typical flour mill for practicing this long or gradual reduction process of milling might, for example, have the following equipment:

5 breaks
   8 middlings purifiers
   5 bolters (4 sections)
   5 reels
   2 dusters
   10 reduction roll sets In such a mill some of the reduction rolls are double stands, and used to increase the output, although the mill could be operated successfully with single rolls to be used to obtain ten reductions.

The capacity of flour mills is determined principally by the amount of roll surface and purifier and bolting surface. It is customary to have 5 breaks, but in the case of a large mill there might be several stands of rolls for each one of these breaks, while in a small mill a single set of rolls is used for each break. The same relative proportion of purifiers, bolters, reels, etc., would determine the difference in capacity between mills which would otherwise have a similar set-up.

In comparison with such a typical mill, a mill which has been satisfactorily used for the milling of this improved flour contained and used the following equipment:

5 breaks
   5 middlings purifiers
   3 bolters
   3 reels
   2 dusters
   9 reduction roll sets and a sifter known and available in the trade under the name "Gyro-whip," and disclosed in U. S. Patent No. 2,159,549 of May 23, 1939, and in which the screens are approximately horizontal, are supported by reeds and moved in approximately horizontal directions by an eccentric driving element which rotates at a speed in the range of approximately 260–315 R. P. M., with a throw of approximately ¾ to 1½ inches. The difference in the amount of mechanical equipment used in the different mills in the practice of the long reduction process is largely one of capacity of reduction, rather than of procedure.

In the drawings I have shown a flow sheet of a mill suitable for making both this improved flour and regular white flour, depending upon the adjustments and connections. Mills for making wheat flour by the long reduction process of milling vary in the number of devices such as bolters and reduction and break roll sets, the difference in the amount of mechanical equipment for this process being more a matter of capacity rather than of procedure. In the flow sheet of the drawings, there are 5 break roll sets, 10 reduction roll sets, 16 bolter sections labeled from left to right as "1st Brk. bolter," "2nd Brk. bolter" etc. A plurality of these sections are commonly combined into one physical unit for operation by a common motor or source of power. Other equipment commonly used in the long reduction process of milling includes several purifiers, a scalp reel and dusters.

In the usual gradual reduction process the break rolls are set for what is known as a "high" grinding operation in which the tempered grains are first merely slightly cut or cracked open and all of the bran coatings removed by a sort of peeling operation from the remainder of the grain or endosperm, with a minimum of crushing of the endosperm or body of the grain. For this purpose the rolls are set relatively far apart, and to produce a progressive reduction of the grains. The product from the break rolls, except for the bran from the end of the break system forming the "overs" and those particles of the endosperm having the fineness of flour, pass through the reduction system, during which the wheat germ is removed and the remainder of the endosperm reduced to flour and feed, classified and purified. In that regular method of making white flour, the purpose of the break system is to produce the maximum possible quantity of coarse and medium middlings, and to avoid as far as possible the production of fine middling material, dust and break flour.

To accomplish this, the miller adjusts the break rolls at such a wide relationship as will produce the greatest possible output of the desired granular type of middlings or endosperm. The "high grinding" method of milling derives its name from this principle, which is that the rolls are not set close together but are set "high" for the very definite object of removing all of the bran coatings by this gradual peeling off of the bran, while leaving the endosperm in a relatively coarse granular condition and separated from the bran. Some of the particles of the outer portion of the endosperm adhere to the bran and are utilized with the bran as feed for live stock.

There is a considerable variation in the moisture content of wheat when it is delivered to mills for grinding. Wheat that has been placed in an elevator for storage, or that has been re-handled or re-shipped, usually tends to lose some of its original moisture and contains from 10½% to 12½% of moisture after such re-handling, while wheat delivered direct from growers, except for wheat delivered to mills direct from growers, except for variations due to weather and other conditions, may have a moisture content ranging from 12% to 15%. It is common practice in the milling industry to add sufficient water to the wheat grains in the tempering process when making white flour, so that the moisture of the wheat when delivered to the first break rolls will run between 14% and 16½%. In accordance with the present invention, the wheat should not ordinarily be tempered, but if tempered at all, the addition of moisture should only be very slight, so that the wheat as delivered to the break rolls in accordance with the present invention preferably should not contain more than approximately 13% of moisture, which is materially less than possessed by the tempered grains passing through the break rolls in the manufacture of ordinary white flour.

In accordance with this present invention, the grains, after being first cleaned and scoured, the same as in the milling of white flour, are ground in the same break rolls as those employed in the manufacture of white flour, except that in accordance with this invention the break rolls are all set close or adjusted for a very close breaking, in contrast to the relatively open or wide space between these rolls when employed in the milling of white flour. By this close breaking and grinding of the wheat, all of the grains thereof, including all of the bran, will be ground and cut up into relatively small particles. The "overs" from the sifters through which the ground grains are passed from the last break rolls are passed to the usual bran duster and no part of the germ is removed but is kept in the system and subjected to continued milling with the rest of the grain. The portions passing over the bran duster are then passed to the "gyro-whip" sifter, the "throughs" going to the mixing conveyor. The "throughs" from the various break rolls are otherwise handled the same as in making ordinary white flour, and all particles not of flour fineness pass through the reduction system in the same manner and are handled the same, except that all of the particles of flour fineness from the reduction system and the break roll system are passed to the mixing conveyor and the "overs" from the bran dusters and shorts dusters are passed through the "gyro-whip" sifter, the fine particles from the "gyro-whip" sifter passing to the flour mixing conveyor.

In the drawings I have illustrated diagrammatically a typical flow sheet for a common mill suitable for making ordinary white flour and showing the simple manner in which it is modified for making this improved flour. The two figures together constitute the typical flow sheet and are disposed side by side, with Fig. 1 on the left and Fig. 2 on the right, and the flow is in the direction of the arrows. The connections between the figures where they are joined are designated respectively, from top to bottom, by conduits $a$, $b$, $c$, $d$, $e$, $f$, $g$, $h$, $i$, $j$, $k$, $l$, $m$, $n$, $o$, $p$, $q$, $r$, $s$, $t$, $u$, and $v$; also purifier #3 is shown partly in Fig. 1 and partly in Fig. 2.

In the diagram of the drawings, the flow of ordinary white flour particles is delivered to the mixing conveyor A through the conduit designated by the dash lines 10, and in the making of such ordinary white flour, the low grade flour which is kept separate from the standard white flour (collected in conduit 10), is collected by conduits 11 and 12 respectively. The red dog flour in the same milling process is separately collected by conduit 13. To this equipment the "gyro-whip" sifter 14 is added. In making the improved flour by this milling system, the break or reduction rolls are set or adjusted, as hereinabove explained, and the overs from the bran duster 15 and shorts duster 16 being then connected by manipulation of suitable valves 17 and 18 respectively to the "gyro-whip" sifter. The overs from sifter 14 are delivered to the feed from the feed reel and the throughs from sifter 14 are delivered to the standard flour mixer A by conduit 19. In making this improved flour the flour from low reel 20 and from bran and shorts duster reel 21 are delivered by conduits 11 and 12 respectively to the common conduit $t$ which leads to the mixing conveyor A. The red dog flour from low reel 20 is also diverted by a valve 22 into conduit $t$ in making this improved flour.

During this processing of the grains in this long process, the grinding and working of the bran so intensively and while in such small particles, appears to break off or separate the coarse, hard, fibrous particles of the bran from the brittle mineral bearing portion of the bran, and the brittle portions being easily reduced to the fineness of flour, are easily separated from the fibrous particles of the bran. These brittle portions of the bran or integument of the grain are believed to be largely the aleurone cells forming the aleurone layer of the bran, which is the layer immediately next to the endosperm or white portion of the grain. This brittle portion or inner layer of the bran which is next to the endosperm, in being removed from the bran carries with it portions of the endosperm which in the usual milling process have adhered to the bran coating and have been lost, in so far as flour is concerned, because such portions went into the feed. However, in this process the resultant flour contains substantially all of the wheat grain including the wheat germ and all of the endosperm, except the fibrous hard particles of the bran which are unassimilable and of no food value. An examination of the bran particles discarded in accordance with the present invention indicates there is no substantial quantity of the non-fibrous portion of the wheat grains adhering to the hard, fiborus portions of the discarded bran, and because of the fact that the fibrous portions of the bran maintain a fibrous character and shape even though finely ground, they are easily separated from the relatively brittle cellular matter which is worked loose from the fibrous portion of the bran and included in the flour during this long process of milling.

By way of illustration as to the setting of the break rolls in accordance with this invention, a comparison was made between the products of the different breaks when the breaks are set for the manufacture of ordinary white flour and for the manufacture of the improved flour. The comparison is illustrated in the following table, it being understood that the products of each break, in both the regular white flour method and the present process, were sifted through four different sifters in order to compare the relative fineness of grinding by the old and new process. In this table, the numbers of the sieves are well known numbers in the flour industry as indicating the mesh thereof, and in this table the improved product is designated by the letters H—W.

*Comparison of the per cent of the ground products passing separately through different sieves in different breaks for regular white flour and this improved flour identified as H—W*

| Number of sieve used | Percent of 1st break | | Percent of 2nd break | | Percent of 3rd break | | Percent of 4th break | | Percent of 5th break | |
|---|---|---|---|---|---|---|---|---|---|---|
| | H-W | Reg. | H-W | Reg. | H-W | Reg. | H-W | Reg. | H-W | Reg. |
| Through No.— | | | | | | | | | | |
| 86 | 7.8 | 4.2 | 11.8 | 5.5 | 5.3 | 14 | 4.8 | 9.2 | 3.5 | 5 |
| 62 | 4.5 | 2.7 | 18.8 | 4.5 | 6.1 | 12.7 | 6.3 | 7.1 | 4.8 | 3.5 |
| 38 | 12.6 | 7.1 | 32.9 | 14.4 | 10.1 | 19.6 | 10.4 | 10 | 12.2 | 6.5 |
| 16 | 51.5 | 27.9 | 73.6 | 45.8 | 71.6 | 49.7 | 77 | 65.9 | 99.2 | 64 |

In the foregoing table, the #86 sieve has approximately 86 openings per linear inch and is also known as No. XX8 bolting cloth; the #62 sieve has approximately 62 openings per linear inch and is also known as No. XX4 bolting cloth; the #38 sieve has approximately 38 openings per linear inch and is also known as No. XX0 bolting cloth; and the #16 sieve has approximately 16 openings per linear inch and is also known as No. 16GG bolting cloth. The purpose of this table is to show that for any selected sieve, the percentage passing through from the earlier breaks is greater for the improved flour than for the regular white flour, which indicates a much closer grinding or setting of the break rolls for the improved flour than for ordinary flour.

In the foregoing comparison table, the percentages given as passing through the different screens #62, #38 and #16, are not the percentages of the original sample, but are the percentages of the stock of the sample not passing through the screen in the preceding sifting of the sample. If the percentages in the same test are based on the proportion of the original sample, the results are as follows:

| Sieve number— | 1st break | | 2nd break | | 3rd break | | 4th break | | 5th break | |
|---|---|---|---|---|---|---|---|---|---|---|
| | H-W | Reg. | H-W | Reg. | H-W | Reg. | H-W | Reg. | H-W | Reg. |
| 86 | 7.8 | 4.2 | 11.8 | 5.5 | 5.3 | 14.0 | 4.8 | 9.2 | 3.5 | 5.0 |
| 62 | 4.1 | 2.6 | 16.6 | 4.3 | 5.8 | 10.9 | 6.0 | 6.4 | 4.6 | 3.3 |
| 38 | 11.1 | 6.6 | 23.6 | 13.0 | 9.0 | 14.7 | 9.3 | 8.4 | 11.2 | 6.0 |
| 16GG | 39.7 | 24.2 | 35.3 | 35.4 | 57.2 | 30.0 | 61.5 | 50.1 | 80.1 | 54.8 |
| Left over* | 37.3 | 62.4 | 12.7 | 41.8 | 22.7 | 30.4 | 18.4 | 25.9 | .6 | 30.9 |

*Doesn't go through even coarsest screen.

In the above table, all figures designate grams going through a given screen or sieve, except the horizontal row designated "Left over." Tests on basis of 100 grams of stock leaving each break.

It will be understood that in carrying out the improved process, the setting of the break rolls in the above comparison is that which is preferred, but which may be varied somewhat within the broad principle of the invention.

The fibrous bran particles which are discarded in accordance with the present invention have been found to be substantially inferior as live stock feed, because of the fact that they are composed substantially of cellulose material which is partially unassimilable even by live stock, whereas the bran made in the regular long process of milling white flour is more valuable as a live stock feed. This is a further indication of the substantially complete removal from the bran of the greater portion of its food value.

One of the specific purposes of the purification of middlings in the reduction system for ordinary white flour is to remove all possible bran particles, but in accordance with the present invention it is only desired to remove all the hard fibrous portions of the bran particles. The major separations of the long process of milling are preferably maintained in accordance with this invention in order that the resultant product may be similar in its final form to the most carefully milled white flour. The stock delivered to the rolls of the reduction system, in accordance with the present invention, contains a combination of feed particles, endosperm, the middlings particles and combined feed and middlings particles.

Such a stock requires hard grinding in the reduction rolls and for that reason each successive reduction roll is required to do all that it possibly can to grind down this hard stock. Full grinding pressure must be maintained in the reduction roll system in order to get the stock down to the required or desired fineness which is that of ordinary white flour. The regular bolting system may be employed with the reduction system operated in accordance with this invention, but preferably with a few changes in separations in order that the improved product may retain all of the desirable characteristics and properties of flour made by the long process of milling. The flour from all of the various portions of the process are blended to obtain this improved product.

It will be understood that where the long process of milling includes bran dusters and shorts dusters, the residue or "overs" from those dusters is preferably subjected to a special sifting operation in a sifter of the "gyro-whip" type before being discarded or added to the feed stock. In this "gyro-whip" type of sifter, the details may vary somewhat from those disclosed in U. S. Patent 2,159,549, but the sieves should preferably be given an approximately equivalent motion, speed and throw. The siftings from the "gyro-whip" sifter or its equivalent which have a fineness approximating that of ordinary white flour will be added to the flour from the break roll system and the reduction roll system. In the broader aspects of the invention where the bran and shorts dusters are omitted, a sifter of the "gyro-whip" type is advantageously utilized in place thereof, and the particles from such a sifter having the fineness of ordinary white flour will be added to the flour from the reduction rolls.

In the present invention it should be particularly kept in mind that relatively close grinding is employed through the break roll system, and uniform hard grinding throughout the reduction roll system, and that the wheat grains are substantially untempered because of which substantially all of the hard, fibrous portions of the bran having no food value are excluded from the resultant flour, and all the rest of the grain, including the germ and the brittle portions of the bran, are retained and converted into flour. The germ of the grain and the portions of the endosperm normally adherent to the bran and heretofore diverted to feed therewith, and the brittle portions of the bran which are removed and included in the flour, contribute a characteristic flavor and taste to this improved flour as well as valuable nitrogenous matter, oils, fats and mineral salts, yet the flour is not greatly different in appearance or general baking properties from ordinary white flour.

Flour made in accordance with this invention appears to have substantially all the baking strength and normal characteristics of the best grades of white flour, and baked goods made therefrom remain moist for a longer period of time than similar goods made of ordinary white flour. The various parts of the grain which are included in the flour are included, not by mere physical mixture, but as a constituent part of the milling process, and it is believed that these factors are important in insuring a flour which has most of the advantages of the best grades of white flour, yet it has the additional appeal of the taste of whole wheat flours and it is free from the objectionable and undesirable cellulose bran particles which heretofore have been necessarily contained in whole wheat, entire wheat and graham flours.

It is well recognized and understood that the bran coating of a wheat grain is made up of several layers, at least two of which are cellular and contain considerable valuable minerals and constitute the edible part of the bran, and two or more skin layers that are substantially pure cellulose and very fibrous. These fibrous skin layers have no food value and are practically pure cellulose and are the objectionable parts of the bran. In this improved process, during the milling the cellular parts of the bran are severed from the fibrous skin layers and are separated therefrom in the various milling processes, so that the final discarded portions are substantially only the fibrous skin layers and the final flour has substantially all of the rest of the wheat grain.

It will be understood that various changes in the details, which have been herein described in order to explain the nature of the invention, may be made by those skilled in the art, within the principle and scope of the invention, as expressed in the appended claims.

I claim as my invention:

1. The improved process of making a germ and aleurone containing flour from wheat grains in which substantially all parts of the grains except the fibrous parts of the wheat berry are incorporated, which comprises severing the cellular parts of the bran from the fibrous skin layers of the bran of said grains while subjecting the grains, in a substantially untempered condition and with less moisture content than possessed by grain when milled in making ordinary white flour, to the gradual reduction process of milling with sifting operations at intervals to remove particles substantially of flour fineness, and regrinding of the remaining coarser particles with the germ left in the ground grains and continued through the reduction system, until substantially all of the grain particles except the fibrous skin layers of the bran are of flour fineness, and during said gradual reduction process, reducing the grains initially and rapidly in the break roll system thereof to such an extent that substantially 7.8 percent by weight of the stock of the ground grains coming from the first set of break rolls will pass through a #86 screen sifter with 86 openings per linear inch, separating out and discarding substantially all of the purely fibrous skin layers of the bran that fail to pass through an approximately horizontally disposed screen, having substantial approximately horizontal gyrations and a mesh of screen which passes only particles substantially of flour fineness,. and blending all of the rest of the particles of the milled grains from said process.

2. The improved process of making a germ and aleurone containing flour from wheat grains in which substantially all of the purely fibrous parts of the bran of the grain are eliminated, and the rest of the grains including the germ and substantially all of the aleurone cells are retained in the final flour, which comprises subjecting the grains while in a substantially untempered condition and with less moisture content than possessed by wheat grain when milled in making ordinary white flour, to the modern long, gradual reduction process of milling ordinary white flour and employing at least four pairs of break rolls, at least six gradual reduction rolls, and the usual bolters, purifiers, dusters and reels, but in which all of the break rolls are set very close together so that substantially 7.8% of the stock discharged from the first set of break rolls will pass through an XX8 bolting cloth having 86 openings per linear inch in contrast to the relatively wide setting of the break rolls in making ordinary white flour where a minimum possible crushing of the endosperm is desired, in which all of the reduction rolls are set close together to produce the maximum possible crushing and grinding of the purified middlings, in contrast to the progressive gradual crushing of the middlings in making ordinary white flour by the long process, and in which the germ is retained with and milled with the endosperm, in which long process the particles of regular white flour fineness are sifted out in different steps in the milling and the coarser particles further milled to reduce them to finer particles, sifting the final "overs" from the long process in an approximately horizontal screen which is gyrated approximately horizontally and passes particles of regular white flour fineness, and mixing the throughs from such final sifting with the particles of flour fineness separated out in the intermediate milling steps 3. The process of close grinding of wheat to produce a germ and aleurone containing flour which comprises subjecting substantially untempered grain to a milling action by passing the grain through a break roll system and a reduction roll system, with the germ left with the rest of the grain and continued through the reduction system, setting the first break to such a degree of grinding that at least substantially 7.8 percent by weight of the total discharge from the first break rolls will pass through a number 86 screen also known as XX8 bolting cloth, passing each discharge stream from the last roll pair of the break system and the last roll pair of the reduction system to a separate screen to separate the flour sized particles from the offals and mixing the two offal streams thus obtained, passing the mixed offal stream to a final screen set consisting of substantially horizontal screens which are dressed as for the final grading of a white flour, gyrating said screen set substantially horizontally in a path of diameter of 1½ to 3 inches and at a frequency of approximately 300 complete cycles per minute to thus obtain a stream of purely fibrous particles and a stream of fine flour siftings, separating the particles substantially of flour fineness from the stream of materials passing through the break system and also from the stream of materials passing through the reduction system, and blending such flours, discarding the purely fibrous particles obtained from the final screen set and blending the fine flour siftings with the blended flours from the break and reduction systems.

4. The process of close grinding of wheat to produce a germ and aleurone containing flour which comprises subjecting substantially untempered grain to a milling action by passing the grain through a break roll system and a reduction roll system with the germ left with the rest of the grain and continued through the reduction system, setting the first break to such a degree of grinding that at least substantially 7.8 per cent by weight of the total discharge from the first break rolls will pass through a number 86 sifting screen also known as XX8 bolting cloth, passing each discharge stream from the last roll pair of the break system and the last roll pair of the reduction system through a separate screen to separate the flour sized particles from the offals and mixing the two offal streams thus obtained, passing the mixed offal stream to a final screen set consisting of substantially horizontal screens which are set to remove particles of flour fineness, gyrating said screen set substantially horizontally in an approximately horizontal path to thus obtain a stream substantially of purely fibrous particles and a stream of fine flour siftings, separating the particles substantially of flour fineness from the stream of materials passing through the break system and also from the stream of materials passing through the reduction system, and blending such flours, discarding the purely fibrous particles obtained from the final screen set and blending the fine flour siftings with the blended flours from the break and reduction systems.

5. The method of making a germ and aleurone containing flour from wheat grains which comprises subjecting the wheat grains while substantially untempered to the gradual reduction process of milling white flour from wheat, which process includes a plurality of pairs of break rolls forming a break system, and a plurality of additional pairs of rolls forming a reduction system, with the germ left with the rest of the grain and continued through the reduction system, with the rolls of the break system set for relatively close grinding in contrast to the relatively coarse grinding employed when milling ordinary white flour, and with the first set of break rolls set to such a degree of grinding that substantially 7.8 per cent by weight of the total of the discharge therefrom will pass through an XX8 bolting cloth having 86 openings per linear inch, and with the rolls of the reduction system set for approximately uniform and hard grinding throughout the system, separating off from the ground wheat in both systems, the particles of flour fineness, leaving only purely fibrous portions of the bran, and discarding such separated fibrous portions.

6. The method of making a germ and aleurone containing flour from wheat grains which comprises subjecting the wheat grains while substantially untempered to the gradual reduction process of milling white flour from wheat, which process includes a plurality of pairs of break rolls forming a break system, and a plurality of additional pairs of rolls forming a reduction system, with the germ left with the rest of the grain and continued through the reduction system, with the rolls of the break system set for relatively close grinding in contrast to the relatively coarse grinding employed when milling ordinary white flour, and with the first set of break rolls set to such a degree of grinding that substantially 7.8 percent of the total discharge therefrom will pass through an XX8 bolting cloth having approximately 86 openings per linear inch, and with the rolls of the reduction system set for fine grinding throughout the system, in which reduction process the particles of flour fineness are sifted from the broken up grains leaving different stages in the break rolls and reduction rolls, finally sifting the feed from such milling in a screen that is disposed and gyrated approximately horizontally to remove therefrom all particles of flour fineness from the coarser fibrous particles thereof, and incorporating together the through siftings from such sifter with the flour particles from the reduction process of such milling which have a fineness approximately as small as ordinary white flour.

7. The method of making a germ and aleurone containing flour from wheat, generally by the long or gradual reduction process of milling wheat grains having a break roll system and a gradual reduction system, which comprises passing the wheat grains while substantially untempered through the long process of milling, which process includes a plurality of pair of break rolls forming a break system, and a plurality of additional pairs of rolls forming a reduction system, with the germ left with the rest of the grain and continued through the reduction system, with the rolls of the break system set for relatively close grinding in contrast to the relatively wide spacing between the break rolls when milling ordinary white flour from wheat, and with the first set of break rolls set to such a degree of grinding that substantially 7.8 per cent of the total discharge therefrom will pass through an XX8 bolting cloth having approximately 86 openings per linear inch, and with the rolls of the reduction system set for hard grinding, and subjecting the feed stock from the long reduction process to a final sifting operation in a screen that is disposed and gyrated approximately horizontally to remove particles of flour fineness from purely fibrous parts of the wheat berry, discarding the purely fibrous residue from such final sifting operation, and combining the fines from such operation with the fines from the long reduction system and break system to provide the improved flour.

8. The improved method of making a germ and aleurone containing flour from wheat grains which comprises subjecting the grains, with less than approximately 13 per cent of moisture content and less than would be commonly employed for the making of ordinary white flour from the same grains, in that condition to the gradual reduction process of milling commonly employed for making white flour from wheat, and in which the grains are passed through rolls of a break system and the rolls of a gradual reduction system, with the germ left with the rest of the grain and continued through the reduction system, but in which the rolls of the break system are set for relatively close grinding in contrast to the relatively coarse grinding employed when milling ordinary white flour, the closeness of the rolls being such that substantially 7.8 per cent by weight of the discharge from the first break rolls will pass through an XX8 bolting cloth having 86 openings per linear inch, and in which the rolls of the reduction system are set for relatively hard grinding throughout the system, separating out the particles of flour fineness at different steps in the break system and in the reduction system and leaving only the offals from each system, sifting the offals from the break roll system and the gradual reduction system in an approximately horizontally disposed and horizontally gyrating sifter having a mesh approximately the same as for white flour and which removes purely fibrous parts of the wheat berry from the non-fibrous parts of the ground wheat, and also having a rate of movement approximately in the range from 260 to 315 movements per minute and with a throw approximately between ¾ to 1½ inches, and blending the fines so separated from said offals with the particles of flour fineness separated out from the reduction system and break system.

9. The improved method of making a germ and aleurone containing flour from wheat grains which comprises subjecting the grains, substantially untempered, with less moisture content than would be commonly employed for the making of ordinary white flour from the same grains, in that condition to the gradual reduction process of milling commonly employed for making white flour from wheat, with the germ left with the rest of the grain and continued through the reduction system, and having a break roll system with a plurality of sets of break rolls, a plurality of bolters and purifiers, and also a gradual reduction system with a plurality of sets of reducing rolls and bolters, but in which the rolls of the break system are set for relatively close grinding in contrast to the relatively coarse grinding employed when milling ordinary white flour, the closeness of the rolls being such that substantially 7.8 per cent by weight of the discharge from the first break rolls will pass through an XX8 bolting cloth having 86 openings per linear inch, and in which the rolls of the reduction system are set for relatively hard grinding throughout that system, sifting the offals from both systems through an approximately horizontal and horizontally gyrated sieve having a mesh which removes purely fibrous parts of the wheat berry of substantially ordinary white flour fineness, discarding said coarser particles, and blending the fines from said offals with the flour from the reduction system and break system to provide this improved flour.

10. The method of making a germ and aleurone containing flour from wheat, generally by the long or gradual reduction process of milling wheat grains having a break roll system and a gradual reduction system, which comprises passing the wheat grains while substantially untempered through the long process of milling, with the germ left with the rest of the grain and continued through the reduction system with the rolls of the break system set for relatively close grinding in contrast to the relatively wide spacing between the break rolls when milling ordinary white flour from wheat, and to such a degree of close grinding that substantially 7.8 per cent by weight of the discharge from the first break rolls will pass through an XX8 bolting cloth having 86 openings per linear inch, and with the roller of the reduction system set for hard grinding, passing each discharge stream from the last roll pair of the break system and the last roll pair of the reduction system to a separate screen to separate the flour sized particles from the offals, and subjecting the offals so obtained to a final sifting operation by a sieve disposed approximately horizontal and gyrated approximately horizontally to remove particles of flour fineness, discarding the purely fibrous residue failing to pass through this final sifting operation, and combining the fines from the sifter with the fines from the long reduction system and break system to provide the improved flour.

11. In the process of producing a germ and aleurone containing flour from wheat grains by the long or gradual reduction process of milling, which includes the passing of the wheat grains first in succession through a system of break rolls and then middlings from the break rolls through a gradual reduction system, that improvement in said process which comprises passing the grains through the long milling process while in a substantially untempered condition, with the germ left with the rest of the grain and continued through the reduction system, and with the rolls of the break system set for relatively close grinding in contrast to the relatively coarse grinding and wider spacing between the rolls employed in the break system when milling white flour, and to such a degree of close grinding that substantially 7.8 per cent by weight of the discharge from the first break rolls will pass through an XX8 bolting cloth having 86 openings per linear inch, and with the rolls of the gradual reduction system set for relatively hard grinding, passing each discharge stream from the last roll pair of the break system and the last roll pair of the reduction system to a separate screen to separate the flour sized particles from the offals, subjecting the offals from the break roll system and the gradual reduction process to a sifting operation to remove all particles not substantially of flour fineness in a sifter having an approximately horizontally disposed fine screen which is gyrated approximately horizontally and removes particles of substantially flour fineness, discarding the coarser, purely fibrous particles failing to pass through said horizontal screen, and combining the fines from such sifter with the fines from the break rolls and the gradual reduction system to provide this improved flour.

GLENN H. PERRIGO.